United States Patent [19]

Umehara et al.

[11] Patent Number: 4,797,106
[45] Date of Patent: Jan. 10, 1989

[54] ELECTRONIC BLACKBOARD SYSTEM

[75] Inventors: Seiji Umehara; Katsuyoshi Sakai, both of Kanagawa, Japan

[73] Assignee: Mitsubishi Denki Kabushiki Kaisha, Tokyo, Japan

[21] Appl. No.: 902,488
[22] Filed: Sep. 2, 1986

[30] Foreign Application Priority Data

Sep. 6, 1985 [JP] Japan ............... 60-197343
Sep. 6, 1985 [JP] Japan ............... 60-197344
Dec. 23, 1985 [JP] Japan ............... 60-287966

[51] Int. Cl.⁴ .......................... H04N 1/024
[52] U.S. Cl. ..................... 434/408; 358/256; 358/285
[58] Field of Search ............... 434/408; 358/256, 285

[56] References Cited

U.S. PATENT DOCUMENTS 4,587,568 5/1986 Takayama et al. ............... 358/285
4,609,946 9/1986 Thaler .
4,725,889 2/1988 Yaniv et al. .

FOREIGN PATENT DOCUMENTS 176767 11/1982 Japan .

Primary Examiner—Leo P. Picard
Attorney, Agent, or Firm—Wolf, Greenfield & Sacks

[57] ABSTRACT

An electronic blackboard system capable of using an existing white board or blackboard which may even be one that is already installed on a wall.

11 Claims, 5 Drawing Sheets

Fig. 1
Fig. 2
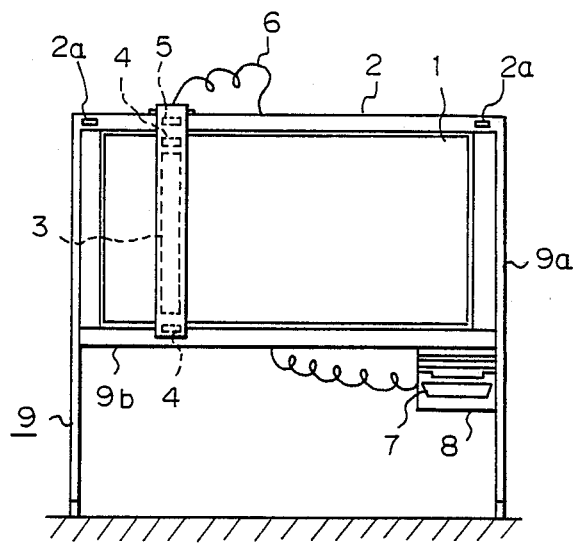
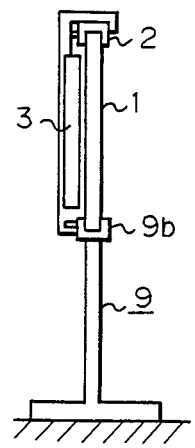
Fig. 3
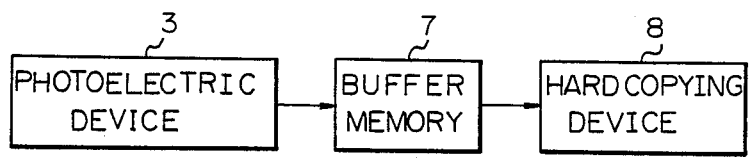

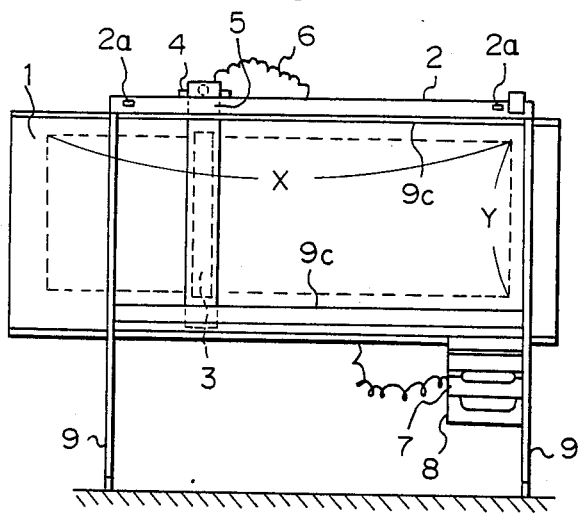
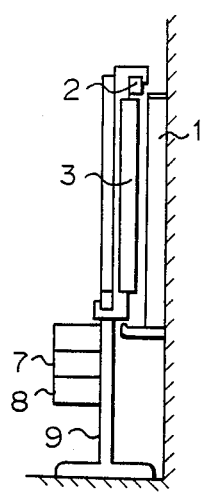
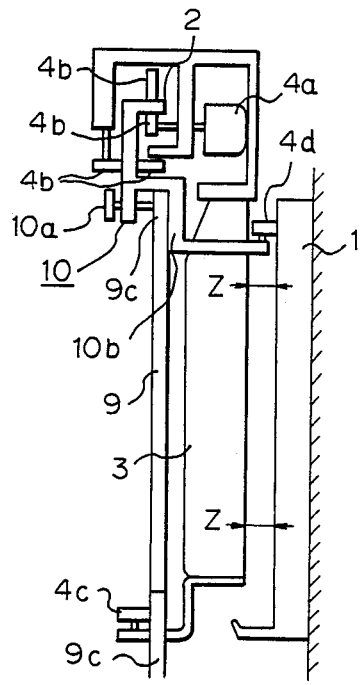

Fig. 7
Fig. 8
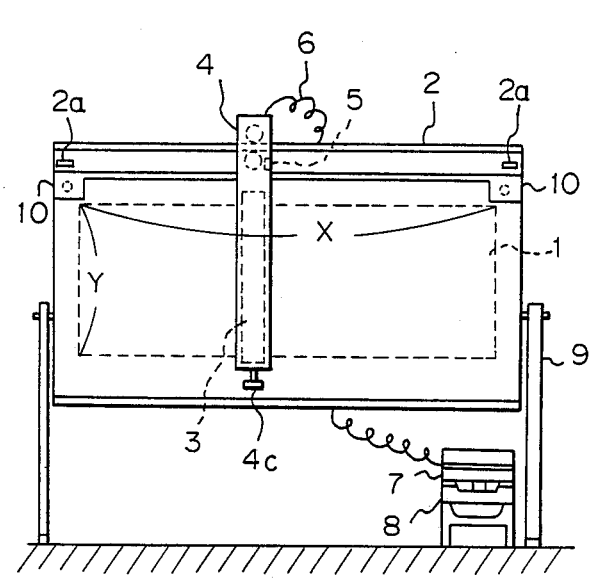
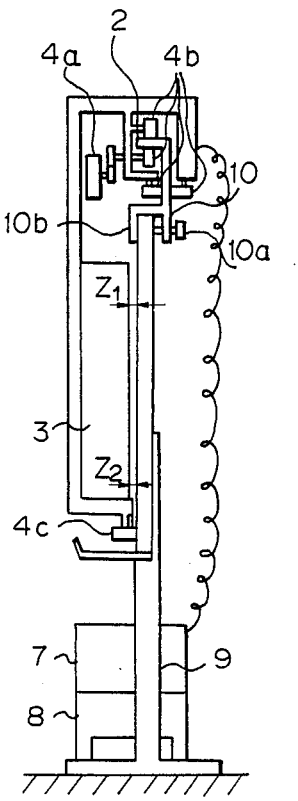

ELECTRONIC BLACKBOARD SYSTEM

BACKGROUND OF THE INVENTION

1. Field of the Invention

The present invention relates to an electronic blackboard system and more specifically to an electronic blackboard system adapted to provide a hardcopy of the information written on such information writing boards as white boards, blackboards or the like.

2. Description of the Prior Art

FIG. 1 is a front view showing a conventional electronic blackboard system as previously proposed by, for example, the applicant of the present invention. FIG. 2 is a side view of the electronic blackboard system shown in FIG. 1. FIG. 3 is a block diagram showing the flow of signals in the electronic blackboard system shown in FIG. 1. In the respective drawings, numeral 1 denotes a board on which information can be written, numeral 2 denotes a guide rail attached to said information writing board 1 in such a manner as to be parallel to the upper edge thereof, numeral 3 designates a photoelectric conversion device (a photoelectric device) having a CCD (charge coupled device) image sensor longitudinally formed therein, a light receiving part being arranged on the front face of the imagesensor and LED (light emitting diodes) being arranged side by side at the side of the light receiving part, numeral 4 designates driver means respectively attached at the opposite ends of said photoelectric device 3 and adapted to move said photoelectric device, 3 leftwardly and rightwardly in synchronism with each other, numeral 5 designates a position detector comprising a light source (LED) and a photosensor facing each other and adapted to detect the presence therebetween of any of the tongue pieces or strips 2a which are provided at the opposite ends of said guide rail 2, numeral 6 designates a cable for signals which is connected to the power source (not shown), numeral 7 designates a buffer memory adapted to store the information images derived from the photoelectric device 3, numeral 8 designates a device for producing a hardcopy, such as a printer or the like, and numeral 9 designates a stand provided with a lateral frame (a supporting portion) 9a for the information writing board 1, the guide rail 2, the buffer memory 7 and the hardcopying device 8 and a guide rail part 9b adapted to guide the lower end of the drive device 4 and capable of stably supporting the entire blackboard device on a floor.

Next, operation of the blackboard device according to a prior art as shown in FIG. 1 through FIG. 3 will be explained. In the blackboard system constructed as above mentioned, the photoelectric device 3 employed is of such a type that the light receiving part and LED are slightly spaced apart from the information input face, or of the so-called closely contacting type wherein the information written on the information writing board 1 is read in terms of longitudinal lines and converted into electrical signals. Said photoelectric device 3 is caused to move leftwardly or rightwardly at a constant speed by means of the drive device 4 and to stop at certain positions so as to enable said position detector 5 to detect the presence of said tongue pieces 2a or at the positions at the left end or the right end of the information writing board 1. In this way, when the photoelectric detector 3 has been displaced to the right end from the left end of the information writing board 1 or from the left end to the right end thereof, an information image on the blackboard is obtained by means of the CCD image sensor constituting the photoelectric device 3 and this information image may be recorded by the hardcopying device 8 after being stored in the buffer memory.

Problem in the Prior Art

Since the electronic blackboard system according to prior art is constituted as above, there has been a problem in that the blackboard system had to be provided solely for an electronic blackboard system because of the arrangement and construction of the information writing board 1 and the stand 9 with respect to the remaining parts such as the guide rail 2, the drive device 4 and the like.

Further it has been impossible for the conventional electronic blackboard system to be utilized for reading from a white board or a blackboard embedded in or attached to a wall.

SUMMARY OF THE INVENTION

The present invention has been proposed to eliminate such problems as above mentioned and has as one of its objects the provision of an electronic blackboard system capable of being applied to an information writing board of a normal white board or blackboard.

Another object of the present invention is to provide an electronic blackboard system capable of reading out information from the information writing board of a white board or a blackboard embedded in or hung on a wall.

The present invention provides such an electronic blackboard system wherein a photoelectric conversion device is made movable left and right along a guide rail, left and right stands supporting the guide rail are provided to enable the photoelectric device to maintain its position relative to the stands, the stands are capable of maintaining their position relative to the information writing board, the relative position of the photoelectric conversion device and the information reading board is maintained, and the memory and the hard copying machine are accommodated in independent boxes.

With the above-mentioned constitution, the relative position between the photoelectric device and the stands may be maintained by means of the attachment mechanism provided at the guide rail and the rollers provided at the lower end of the drive device and the relative positional relationship of these stands and the information writing board of a normal white board or blackboard is maintained so that the relative positional relationship of the photoelectric device and the information writing board may be assured.

Further, the present invention provides an electronic blackboard system wherein an attachment mechanism adapted to attach the system to the information writing board of a normal white board or blackboard is provided, rollers adapted to roll in contact with the information writing board of a normal white board or blackboard are provided at the lower end of a drive device and a memory and a hardcopying device are accommodated in independent boxes which rest directly on a floor.

Due to this constitution of the present invention, it is possible to keep the relative positional relationship of the information writing board of a normal white board or blackboard with respect to a photoelectric device by means of the attachment mechanism provided at the guide rail and the rollers provided at the lower end of the drive device.

The present invention further provides an electronic blackboard system wherein a pair of left and right struts are connected by a guide rail and positioning rollers adapted to roll in contact with the information writing board are provided in the drive device for moving the photoelectric device along the guide rail.

Owing to this constitution of the present invention, the relative positional relationship of the information writing board and the photoelectric device may be maintained by the guide rail connected between the struts which stand at the opposite sides of a white board or a blackboard attached to a wall and positioning rollers provided in the driver means.

BRIEF DESCRIPTION OF THE DRAWINGS

FIG. 1 is a front view showing an electronic blackboard device according to a prior art;

FIG. 2 is a side view of the electronic blackboard device shown in FIG. 1;

FIG. 3 is a block diagram showing the flow of signals in the electronic blackboard device shown in FIG. 1;

FIG. 4 is a front view illustrating an embodiment of the electronic blackboard device according to the present invention;

FIG. 5 is a side view of the electronic blackboard device shown in FIG. 4;

FIG. 6 shows in detail the side view of the electronic blackboard device shown in FIG. 4;

FIG. 7 is a front view showing another embodiment of the electronic blackboard device according to the present invention;

FIG. 8 shows in detail the side view of the electronic blackboard device shown in FIG. 7;

In the drawings, the same reference numerals designate parts which perform the same or like functions.

DETAILED DESCRIPTION OF PREFERRED EMBODIMENTS

Figure 9:
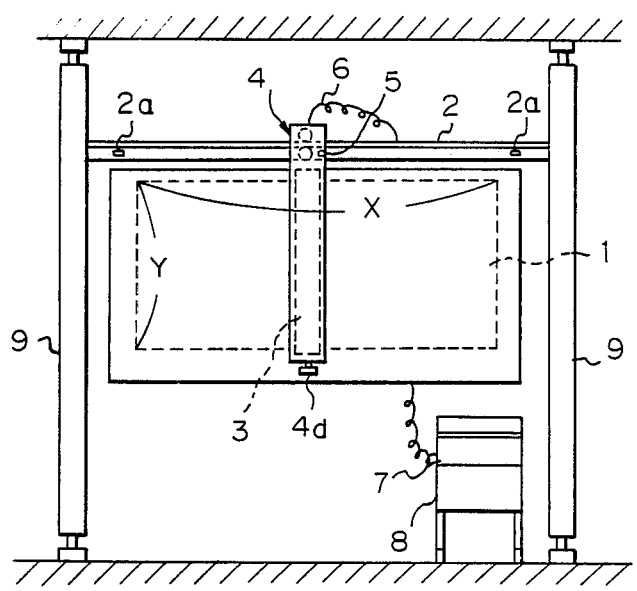
FIG. 9 is a front view illustrating a further embodiment of the electronic blackboard device according to the present invention.

FIG. 4 is a front view showing an electronic blackboard system according to an embodiment of the present invention. FIG. 5 is a side view of the electronic blackboard system shown in FIG. 4. FIG. 6 shows in detail the side view of the electronic blackboard system shown in FIG. 4. In the respective drawings, numeral 1 designates an information writing board, numeral 2 designates a guide rail, numeral 3 designates a photoelectric conversion device and numeral 4 designates a drive device. Said drive device 4 comprises a motor 4a, a plurality of rollers 4b connected to said motor 4a through a power transmitting system, rollers 4c adapted to roll in contact with the lateral frame 9c of the stands 9 provided at the lower end thereof, and so forth. Said rollers 4b are disposed in such a manner that they are able to grasp the guide rail vertically and horizontally and are adapted to roll in contact with the guide rail 2. Attached to the attachment plate 10 are rollers 4d which serve to assure its relationship with the information writing board 1. Numeral 5 designates a position detector, numeral 6 designates a cable for signals, numeral 7 designates a buffer memory and numeral 8 designates a hardcopying device. Said attachment plate 10 serves as an attachment mechanism for attaching a stand 9 which is added to a part of the guide rail 2 as well as the guide rail itself, and consists of a screw 10a and a receiving part 10b.

In the electronic blackboard system according to the present invention which is constructed as above, the lateral frame 9c of the stand 9 is interposed between said receiving part 10b of the attachment mechanism (or attachment plate) 10 and the screw 10a so that when clamped by said screw, the guide rail 2 is fixed. In this condition, the rollers 4c provided at the lower part of the drive device 4 are caused to contact the lateral frame 9c of the stand 9 and thus define the lower end position. When the relative positional relationship of the information writing board 1 relative to the entire system is established by the rollers 4d which are added to the attachment mechanism 10, the electronic blackboard system is operable in the same manner as explained with respect to the conventional blackboard system. When the electronic blackboard system of this sort is attached to a blackboard or a white board installed on a wall in a room, although there will be a problem regarding how to keep a relative position, it will be made possible to secure a specified reading area XY by moving the stand 9 leftwardly or rightwardly in relation to the reading area of the information writing board 1 or displaceably attaching the guide rail 2 vertically. Further, unless a proper spacing Z is established between the information writing board 1 and the photoelectric device 3, the information may not be converted photoelectrically due to being out of focus. However it is to be noted that the specified spacing Z may be secured by maintaining the contact of the rollers 4d provided in the attachment mechanism 10. It is also to be noted that where the buffer memory 7 and the hardcopying device are attached to the stand 9 or installed on a floor, they will not keep their relative positions with respect to the normal blackboard or the white board installed on a wall.

As explained above, since in the electronic blackboard device according to the present invention the photoelectric device is attached to a stand, it is possible to secure the relative positional relationship of the blackboard or the white board which is installed on a wall in a room and to read out information from a plurality of blackboards or white boards. Thus an information writing board or a stand for exclusive use is not necessary and the remarkable advantage of being able to apply the present electronic blackboard device to the information writing board of a normal blackboard or white board can also be attained.

FIG. 7 is a front view illustrating the electronic blackboard system according to another embodiment of the present invention. FIG. 8 shows in detail a side view of the electronic blackboard system shown in FIG. 7. In the respective drawings, numeral 1 designates an information writing board, and numeral 9 designates a stand wherein both the information writing board 1 and the stand 9 integrally constitute a white board or a blackboard such as are generally available on the market. Numeral 2 designates a guide rail, numeral 3 designates a photoelectric conversion device and numeral 4 designates a drive device. Said drive device 4 consists of a motor 4a, a plurality of rollers 4b connected to said motor 4a through a power transmitting system, rollers 4c provided at the lower end of the information writing board 1 and adapted to roll in contact therewith, and so forth. Said rollers 4b are disposed in such a manner as to be capable of grasping the guide rail 2 both vertically and horizontally and are adapted to roll in contact with the guide rail 2. Numeral 5 designates a position detector, numeral 6 designates a cable for signals, numeral 7 designates a buffer memory and numeral 8 designates a hardcopying device. The attachment plate 10 serves as an attachment mechanism for attaching an information writing board 1 and the guide rail 2 and comprises a screw 10a and a receiving part 10b.

In the electronic blackboard system according to the present invention constituted as above, the guide rail 2 and the information writing plate 1 may be fixed by interposing the information writing plate 1 between the receiving part 10b of the attachment mechanism (or attachment plate) and the screw at the upper part of the information writing board 1 of a normal white board or a blackboard and fastening it with the screw 10a. In this condition, the rollers 4c provided at the lower part of the drive device 4 are caused to make contact with the information writing board 1 and define the lower end position of the drive device 4. When the relative position of the information writing board 1 and the electronic blackboard system is established, the entire system is operable in the same manner as explained with respect to the prior art electronic blackboard system. It will be a problem, however, to keep the relative position when the electronic blackboard system is attached to an existing normal white board or blackboard. It may be understood, however, that a specified reading area XY may be assured when disposing and attaching the guide rail 2 by aligning the reference edges, namely the upper edge and the left edge or the right edge, with respect to the leftward and rightward directions and upward and downward directions which define the reading area XY on the information writing board 1. On the other hand, unless the spacing Z between the information writing board 1 and the photoelectric device 3 is properly established, the photoelectric conversion of the information cannot be properly done due to being out of focus. However, the spacing $Z_1$ at the upper part may be attained by abutting the receiving part 10b against the upper face of the information writing board 1 while the spacing $Z_2$ at the lower part may be obtained by rotatably moving the rollers 4c in contact with the upper face of the information writing board 1 whereby the respective spacing Z may be secured. Further by installing the buffer memory 7 and the hardcopying device independently on a floor, the electronic blackboard system may lose its relationship with a normal white board or blackboard.

Further, it should be understood that although in the above-mentioned embodiment the attachment mechanism 10 has consisted of a screw 10a and a receiving part 10b and rollers 4c have been provided so as to define the position of the lower part of a drive device 4, any mechanism may be applied and similar effects may be obtained to the one attained by the above-mentioned embodiment so long as a normal existing white board or blackboard is freely attachable or detachable and the relative position of the information writing board 1 and the photoelectric device 3 can be assured.

As explained above, since the electronic blackboard system of the present invention is constructed such as to be easily attachable to and detachable from a normal white board or blackboard available on the market and the relative position between the information writing board and the photoelectric device can be assured, an information writing board or a stand for exclusive use may be dispensed with. Additionally, the electronic blackboard system according to the present invention may be attached to and detached from a plurality of normal white boards or blackboards already installed at a different location and thus the system is easily used to great advantage.

Figure 10:
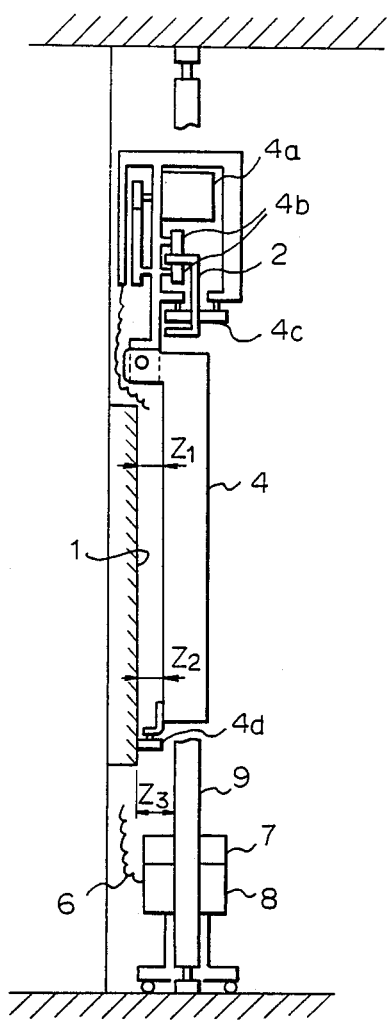
FIG. 10 shows in detail the side view of the electronic blackboard device shown in FIG. 9.

FIG. 9 and FIG. 10 illustrate still another embodiment of the present invention, wherein the information writing board 1 is attached to a wall such as, for example, by embedding it in the wall or the other ways. The drive device 4 which is adapted to move a photoelectric conversion device 3 along a guide rail disposed horizontally consists of motor 4a, a pair of rollers 4b, 4c connected to said motor 4a through a power transmitting system, a positioning roller 4d arranged at the lower end portion of the information writing board 1 and adapted to roll in contact with the information writing board, and so forth. Each of the pairs of rollers 4b, 4c are arranged to interpose the guide rail 2 in the vertical direction as well as the horizontal direction and are adapted to roll in contact with the guide rail 2. Numeral 2a designates tongue pieces. The left and right struts 9 connected by the guide rail 2 are adjustable with respect to their height. The buffer memory 7 and the hardcopying device 8 are accommodated in independent boxes and installed on a floor.

With the above-mentioned construction, the positioning rollers 4d provided at the lower part of the driving device 4 are caused to make contact with the information writing board 1 and are adapted to define the lower end position of the drive device 4. When the relative position of the information writing board 1 and the electronic blackboard system is determined, the entire system will be operated in a way similar to the preceding embodiments of the present invention.

It will be a problem to maintain the relative position when an electronic blackboard of the type according to the present invention is applied to an existing white board or blackboard attached to a wall. However, a specified region XY may be secured by aligning and positioning the guide rail 2 with the reference edge of the information writing board 1, that is the upper edge and the left edge or the right edge, and attaching the struts 9 accordingly. Unless the spacing between the information writing board 1 and the photoelectric device 3 is properly established, the information may not be photoelectrically converted due to being out of focus, but the spacing $Z_1$ at the upper part may be safely secured if a certain constant value is subtracted from the spacing $Z_3$ between the information writing board 1 and the struts 9. On the other hand, the spacing $Z_2$ at the lower part may be defined by causing the positioning rollers 4d to rotatably move in contact with the front face of the information writing board 1. In this way, a specified spacing Z may be obtained.

According to the present information and as described above, since the struts are caused to stand at the opposite sides of the information writing board when attached to a wall and are connected by a guide rail so that the photoelectric device is suitably positioned and also caused to travel, it becomes possible to read the information writing board which was impossible with the prior art devices when applied to information writing boards attached to walls.

Having described preferred embodiments of the invention, it will be apparent to those skilled in the art that other embodiments within the scope of the invention may also be used.

What is claimed is:

1. An electronic blackboard system for positioning in front of and in facing relationship with an existing information writing board to read information written on the board therefrom, said system comprising:
    a pair of left and right struts;
    a horizontal guide rail supported by said pair of struts;
    said struts and guide rail forming a support unit that is disposed separated from and independent of said information writing board;
    a drive means supported from said guide rail and including roller means for contacting said guide rail and to roll in contact with said guide rail;
    a positioning roller means provided at the lower part of said drive means, said roller rolling in contact with an information writing surface of said information writing board;
    a photoelectric conversion device attached to said drive means such as to face the information writing board and adapted to read written information in the form of lines and convert them into electrical signals, said photoelectric conversion device being moved by said drive means in the direction of intersecting said lines to obtain an image of the information written on the information writing board;
    the positioning of said positioning roller means and support unit made so as to provide a uniform spacing between said photoelectric conversion device and information writing board writing surface;
    a memory adapted to store said information image; and
    a hardcopying device adapted to read out the information image contained in said memory and record it.

2. An electronic blackboard system of claim 1 wherein said positioning roller means is the only contact of the drive means with said information writing board.

3. An electronic blackboard system of claim 1 wherein said pair of struts are adjustable with respect to their height.

4. An electronic blackboard system of claim 1 wherein said roller means comprises a pair of rollers which grasp said guide rail therebetween.

5. An electronic blackboard system of claim 4 wherein said drive means includes two pairs of rollers adapted to grasp said guide rail vertically and horizontally respectively, and to roll in contact with said guide rail, and a motor adapted to drive said two pairs of rollers.

6. An electronic blackboard system for positioning in front of and in facing relationship with an existing information writing board to read information written on the board therefrom, said system comprising:
    a support frame comprised of a pair of support struts having at least one horizontal member supported therebetween;
    said support frame disposed separately from and independent of said information writing board;
    drive means including roller means which grasp said support member and roll in contact therewith;
    a photoelectric conversion device attached to said drive means such as to face the information writing board and adapted to read written information in the form of lines and convert them into electrical signals, said photoelectric conversion device being moved by said drive means in the direction of intersecting said lines to obtain an image of the information written on the information writing board;
    means supported from said support frame and adapted to contact said information writing surface to provide a uniform spacing between said photoelectric conversion device and information writing board writing surface;
    the positioning of said means supported from said support frame and adapted to contact said information writing surface, and said support frame itself positioned so as to provide a uniform spacing between said photoelectric conversion device and information writing board writing surface;
    a memory adapted to store said information image; and
    a hardcopying device adapted to read out the information image contained in said memory and record it.

7. An electronic blackboard system as described in claim 6 including positioning roller means provided at the lower part of said drive means, said positioning roller means rolling in contact with said lower horizontal member.

8. An electronic blackboard system for positioning in front of and in facing relationship with an existing information writing board to read information written on the board therefrom, said system comprising:
    a support frame comprised of a pair of support struts having upper and lower horizontal members spacedly disposed therealong;
    said support frame being disposed separated from and independent of said information writing board;
    a drive means including roller means which grasp said upper horizontal member and roll in contact with said upper horizontal member;
    a positioning roller means provided at the lower part of said drive means, said roller rolling in contact with said lower horizontal member;
    a photoelectric conversion device attached to said drive means such as to face the information writing board and adapted to read written information in the form of the lines and convert them into electrical signals, said photoelectric conversion device being moved by said drive means in the direction of intersecting said lines to obtain an image of the information written on the information writing board;
    the positioning of said positioning roller means and support frame made so as to provide a uniform spacing between said photoelectric conversion device and information writing board writing surface;
    a memory adapted to store said information image; and
    a hardcopying device adapted to read out the information image contained in said memory and record it.

9. An electronic blackboard system as described in claim 8 wherein said roller means comprises a pair of rollers that grasp said upper horizontal member therebetween, said upper horizontal member forming a horizontal guide rail for said drive means.

10. An electronic blackboard system as described in claim 9 including an attachment piece for securing the horizontal guide rail to said struts.

11. An electronic blackboard system as described in claim 10 including means supported from said support frame and adapted to contact said information writing surface to provide uniform spacing between said photoelectric conversion device and information writing board writing surface.

* * * * *